US008428866B1

(12) United States Patent
Hayes

(10) Patent No.: US 8,428,866 B1
(45) Date of Patent: Apr. 23, 2013

(54) SYSTEM AND METHOD OF PROVIDING TURN-BY-TURN DIRECTIONS TO NON-SPECIFIC DESTINATIONS

(75) Inventor: Barry Hayes, Palo Alto, CA (US)

(73) Assignee: Google Inc., Mountain View, CA (US)

(*) Notice: Subject to any disclaimer, the term of this patent is extended or adjusted under 35 U.S.C. 154(b) by 278 days.

(21) Appl. No.: 12/834,307

(22) Filed: Jul. 12, 2010

(51) Int. Cl.
*G01C 21/00* (2006.01)

(52) U.S. Cl.
USPC .......................................................... 701/400

(58) Field of Classification Search .................. 701/201, 701/202, 206, 400
See application file for complete search history.

(56) References Cited

U.S. PATENT DOCUMENTS

| | | | | |
|---|---|---|---|---|
| 5,608,635 A * | 3/1997 | Tamai | | 701/428 |
| 6,211,798 B1 * | 4/2001 | Albrecht et al. | | 340/990 |
| 6,266,615 B1 * | 7/2001 | Jin | | 701/488 |
| 6,314,370 B1 * | 11/2001 | Curtright | | 701/412 |
| 6,826,472 B1 * | 11/2004 | Kamei et al. | | 701/426 |
| 7,526,464 B2 * | 4/2009 | Flinn et al. | | 706/52 |
| 7,706,973 B2 * | 4/2010 | McBride et al. | | 701/423 |
| 7,822,539 B2 * | 10/2010 | Akiyoshi et al. | | 701/418 |
| 7,894,984 B2 * | 2/2011 | Rasmussen et al. | | 701/452 |
| 2010/0036603 A1 | 2/2010 | Kang | | |
| 2010/0042317 A1 | 2/2010 | Tajima et al. | | |

* cited by examiner

*Primary Examiner* — Thomas Tarcza
*Assistant Examiner* — Alex C Dunn
(74) *Attorney, Agent, or Firm* — McDermott Will & Emery LLP

(57) ABSTRACT

Aspects of the invention provide systems and methods for providing turn by turn directions based on imprecise destination information. In one embodiment, a user may request turn by turn directions based on a first location, such as an address, and a destination area, defined by the name of a geographic area, such as a city or state. A plurality of access locations may be identified based on the geographic area. These access locations may be displayed to the user so that the user may select a particular destination. The selected location may then be used, along with the first location, to provide a set of turn by turn directions to the user.

20 Claims, 15 Drawing Sheets

SYSTEM AND METHOD OF PROVIDING TURN-BY-TURN DIRECTIONS TO NON-SPECIFIC DESTINATIONS

BACKGROUND OF THE INVENTION

Various navigation systems provide users with turn-by-turn directions. These systems include handheld GPS devices or mobile phones, vehicle-mounted devices, or Internet-based computers with access to websites such as Google Maps. Users input one or more locations and receive a route and turn-by-turn directions based on the inputted locations. The user may follow the turn-by-turn directions to reach the one or more locations.

These navigation systems rely on precise geographic information to determine the location of an inputted location. Thus, where a user inputs an imprecise origination or destination location, some systems may artificially add precision by selecting a specific location associated with the imprecise location, such as a central location in a city or an intersection. For example, a user of Google Maps requesting directions from "San Francisco" to "Palo Alto" is given directions from Van Ness and Market streets in San Francisco, Calif. to Middlefield and Embarcadero streets in Palo Alto, Calif. However, such artificial selections may be inappropriate in many situations.

BRIEF SUMMARY OF THE INVENTION

The invention relates generally to providing turn by turn directions based on imprecise destination information. More specifically, the invention relates to identifying turn by turn directions to a geographic area based on a particular location through which the geographic area may be reached.

One aspect of the invention provides a method for providing turn by turn directions. The method includes receiving, at a computer, a destination area; identifying a plurality of geographic locations associated with the destination area, each of the plurality of geographic locations providing access to the destination area; selecting a list of geographic locations based on the plurality of geographic locations; displaying, at the computer, one or more of the selected geographic locations based on the list; receiving a chosen one of the displayed locations; and providing a set of turn by turn directions to the chosen location.

In one example, the method also includes transmitting the destination area to a second computer; and receiving the turn by turn directions from the second computer. In another example, the method also includes identifying a first geographic location representing a starting location and wherein selecting the list of geographic locations is based on a distance between the first geographic location and each of the plurality of geographic locations. In another example, the method also includes determining a current location of the computer and wherein the turn by turn directions to the chosen location are provided based on the current location of the computer. In another example, the method also includes identifying a first geographic location representing a starting location and wherein the first geographic location and the destination area are stored in memory accessible by the computer. In another example, the method also includes identifying a first geographic location representing a starting location and wherein the destination area is the name of a city and the first geographic location is an address in the city. In another example, the one or more selected geographic locations are displayed on a map with an indication that a user is to choose one of the selected geographic locations.

Another aspect of the invention provides a method for providing turn by turn directions. The method includes receiving, at a computer, a destination area; identifying a first geographic location; identifying a plurality of geographic zones associated with the destination area, where each zone comprises a physical portion of the destination area; storing the plurality of geographic zones in memory; displaying, at the computer, the stored plurality of geographic zones based on the destination area; receiving a selected zone of the displayed plurality of zones; identifying a specific geographic location which provides access to the selected zone based on the selected zone and the first location; and providing a set of turn by turn directions to a user based on the identified specific geographic location and the first geographic location.

In one example, the method also includes transmitting the destination area to a second computer; and receiving the turn by turn direction from the second computer. In another example, identifying the specific geographic location is based on a distance between the first geographic location and the selected zone. In another example, the method also includes determining a current location of the computer and wherein the first geographic location is the current location of the computer. In another example, the first geographic location and the destination area are stored in memory upon input into the computer. In another example, the plurality of geographic locations are stored in memory accessible by a second computer. In another example, the plurality of geographic zones are displayed on a map with an indication that the user is to select one of the plurality of geographic zones.

Another aspect of the invention provides a method for providing turn by turn directions. The method includes receiving, at a computer, a destination area; determining a plurality of geographic locations based on the destination area and the first geographic locations, each of the plurality of geographic locations providing access to the destination area; displaying, at the computer, the plurality of geographic locations; receiving a selected one of the displayed plurality of locations; and providing a set of turn by turn directions to the selected location.

In one example, the method also includes transmitting the destination area to a second computer; and receiving the turn by turn directions from the second computer. In another example, the method also includes identifying a first geographic location representing a starting location and wherein selecting the list of geographic locations is based on an estimated travel time between the first location and each of the plurality of geographic locations.

Another aspect of the invention provides a method for providing turn by turn directions. The method includes receiving, at a computer, a destination area; identifying a first geographic location; determining a plurality of geographic zones based on the destination area and the first geographic location, where each zone comprises a physical portion of the destination area; displaying, at the computer, the plurality of geographic zones; receiving a selected zone of the displayed plurality of zones; identifying a specific geographic location which provides access to the selected zone based on the selected zone and the first geographic location; and providing a set of turn by turn directions to a user based on the identified specific geographic location and the first geographic location.

In one example, selecting the second list of geographic locations is based on an estimated travel time between the first geographic location and each of the geographic locations of the list of geographic locations. In another example, the destination area is the name of a city and the first geographic location is an address.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

Figure 1:
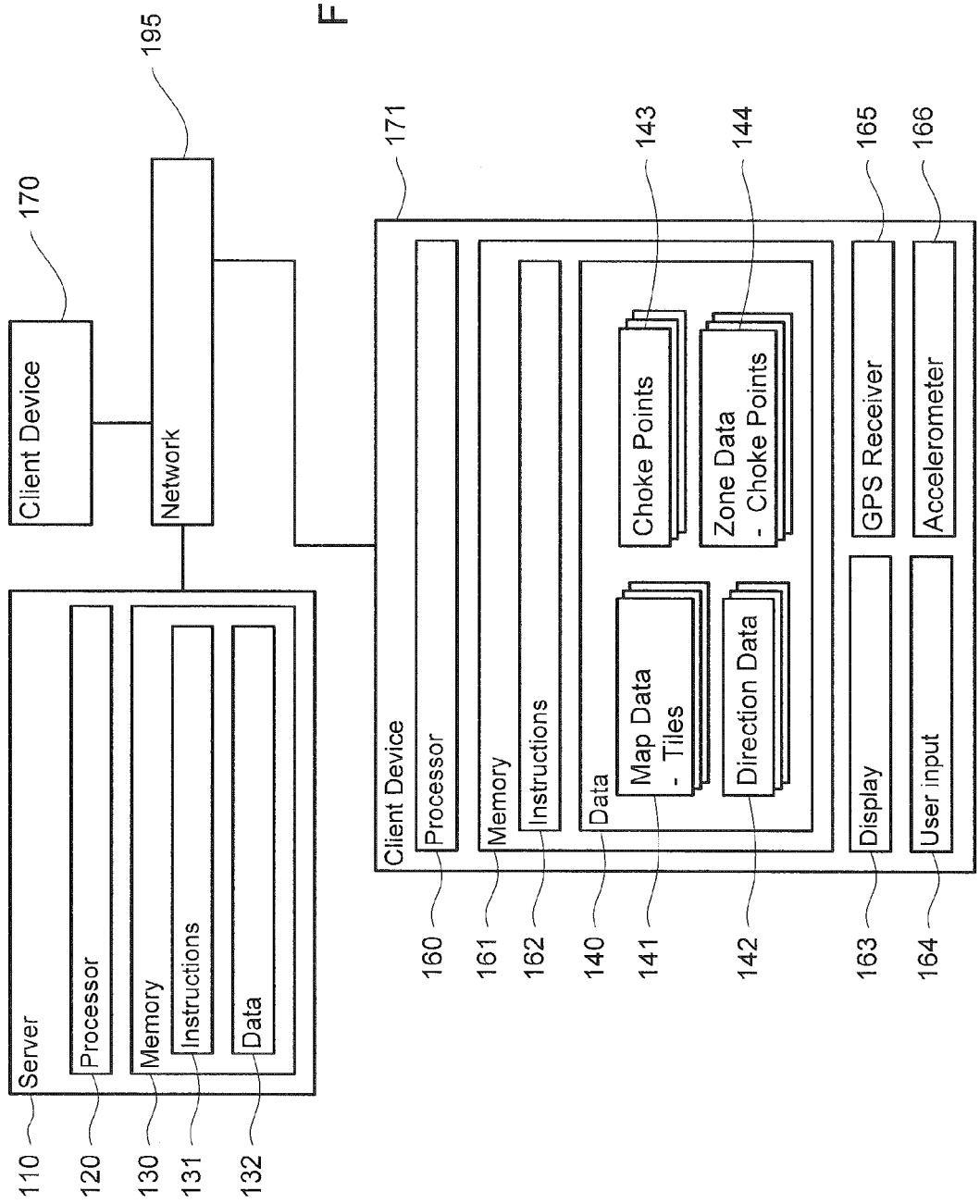
FIG. 1 is a functional diagram of a system in accordance with an aspect of the invention.
Figure 2:
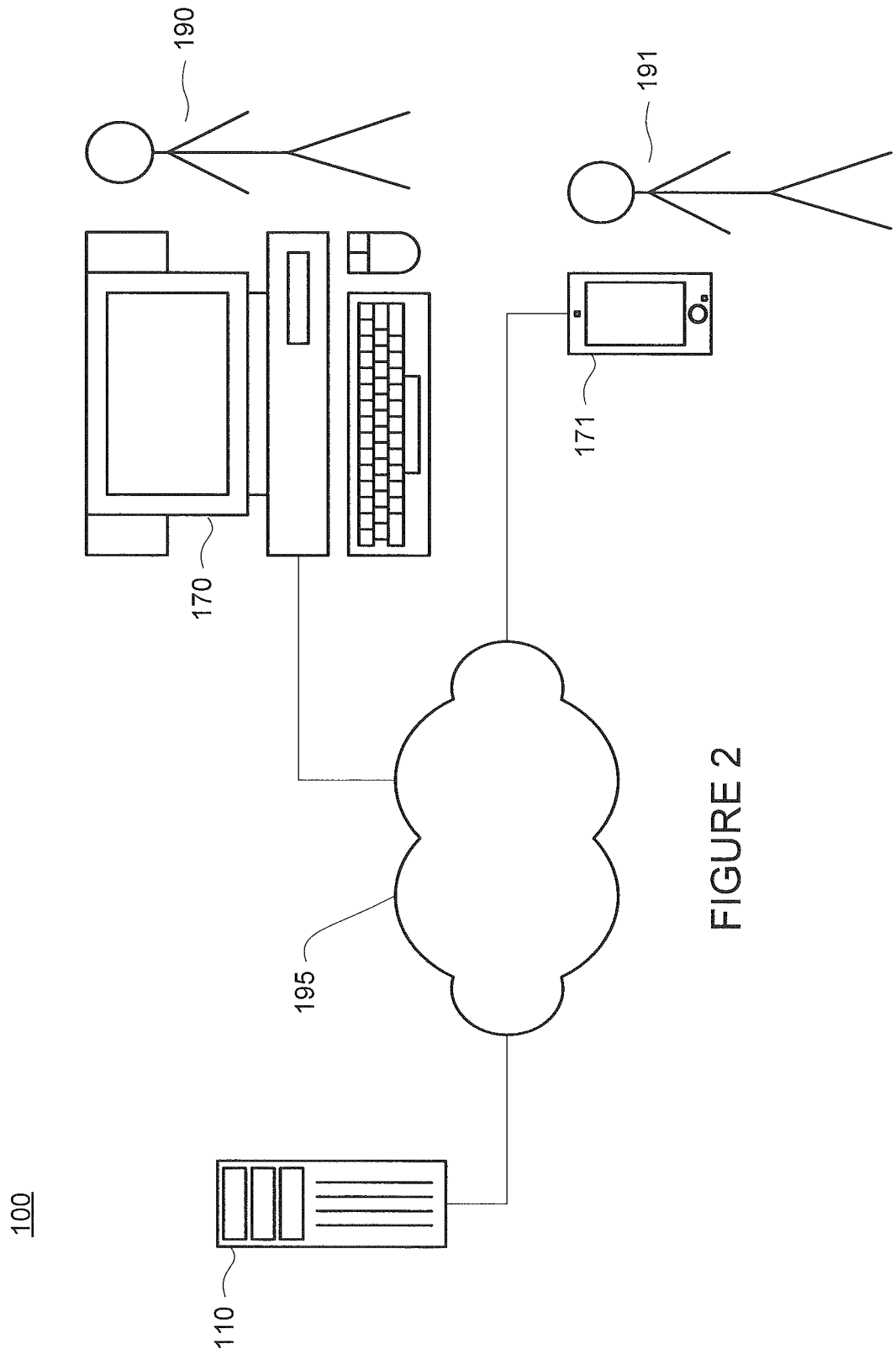
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

Memory 130 stores information accessible by processor 120, including instructions 131 that may be executed by the processor 120. Memory also includes data 132 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 120 may be any well-known processor, such as processors from Intel Corporation or Advanced Micro Devices. Alternatively, the processor may be a dedicated controller such as an ASIC.

The instructions 131 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 132 may be retrieved, stored or modified by processor 120 in accordance with the instructions 131. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

The computer 110 may be at one node of a network 195 and capable of directly and indirectly communicating with other nodes of the network. For example, computer 110 may comprise a web server that is capable of communicating with client devices 170-71 via network 195 such that server 110 uses network 195 to transmit and display information to user 190 on display of client device 170. Server 110 may also comprise a plurality of computers, e.g. a load balanced server farm, that exchange information with different nodes of a network for the purpose of receiving, processing and transmitting data to the client devices; in this instance, the client devices will typically still be at different nodes of the network than any of the computers comprising server 110.

Each client device may be configured similarly to the server 110, with a processor 160, memory 161, instructions 162, and data 140. Each client computer 170-71 may be a personal computer, intended for use by a person 190-91, having all the internal components normally found in a personal computer such as a central processing unit (CPU), display device 163 (for example, a monitor having a screen, a projector, a touch-screen, a small LCD screen, a television, or another device such as an electrical device that is operable to display information processed by the processor), CD-ROM, hard-drive, user input 164 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, set-top boxes for televisions, and other networked devices.

Although the computers 170-71 may comprise a full-sized personal computer, the system and method may also be used in connection with mobile devices capable of wirelessly exchanging data with a server over a network such as the Internet. By way of example only, client device 171 may be a wireless-enabled PDA, hand-held or in-car navigation device, or a cellular phone capable of obtaining information via the Internet. The user may input information using a small keyboard (in the case of a Blackberry phone), a keypad (in the case of a typical cell phone) or a touch screen (in the case of a PDA).

The server 110 and client computers 170-71 are capable of direct and indirect communication, such as over network 195. Although only a few computers are depicted in FIGS. 1-2, it should be appreciated that a typical system can include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. Yet further, although some functions are indicated as taking place on a server and others on a client, various aspects of the system and method may be implemented by a single computer having a single processor.

As shown in FIG. 1, the client devices may also include geographic position component 165, to determine the geographic location and orientation of the device. For example, client device 170 may include a GPS receiver to determine the device's latitude, longitude and altitude position. Thus, as the client device changes location, for example by being physically moved, the GPS receiver may determine a new current location. The component 165 may also comprise software for determining the position of the device based on other signals received at the client device 170, such as signals received at a cell phone's antennas from one or more cell phone towers if the client device is a cell phone.

Client device 171 may also include an accelerometer 166 or gyroscope to determine the direction in which the device is oriented. By way of example only, the device may determine its pitch, yaw or roll (or changes thereto) relative to the direction of gravity or a plane perpendicular thereto. In that regard, it will be understood that a client device's provision of location and orientation data as set forth herein may be provided automatically to the user, to the server, or both.

Client device 170 may store map data 141, at least a portion of which may be transmitted to the client device. For example and as shown in FIG. 1, the client may store map tiles, where each tile is a map image of a particular geographic area. A single tile may cover an entire region such as a state in relatively little detail and another tile may cover just a few streets in high detail. In that regard, a single geographic point may be associated with multiple tiles, and a tile may be selected for transmission based on the desired level of zoom. The map information is not limited to any particular format. For example, the images may comprise street maps, satellite images, or a combination of these, and may be stored as vectors (particularly with respect to street maps) or bitmaps (particularly with respect to satellite images).

The various map tiles are each associated with geographical locations, such that the server 110 and/or client device are capable of selecting, retrieving, transmitting, or displaying one or more tiles in response to receiving a geographical location.

The system and method may process locations expressed in different ways, such as latitude/longitude positions, street addresses, street intersections, an x-y coordinate with respect to the edges of a map (such as a pixel position when a user clicks on a map), names of buildings and landmarks, and other information in other reference systems that is capable of identifying a geographic locations (e.g., lot and block numbers on survey maps). Moreover, a location may define a range of the foregoing. The systems and methods may further translate locations from one reference system to another. For example, the client 171 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939)). In that regard, it will be understood that exchanging or processing locations expressed in one reference system, such as street addresses, may also be received or processed in other references systems as well.

The system may also include direction data 142 for generating turn-by-turn directions based on origination and destination information. Each turn-by-turn direction may be associated with one or more map tiles such that each turn-by-turn direction is displayed with the one or more map tiles.

Data 140 may also include choke point data 143 identifying geographic locations. Choke point data may describe major arteries for travel to a particular geographic area comprising a plurality of geographic locations. For example, a choke point may include a major roadway, an entrance or exit ramp from a roadway, entrances or exits to bridges or tunnels, etc. As will be described in more detail below, this data may be used by server 110 or client device 171 to generate turn by turn directions.

Zone data 144 may identify subareas of a particular geographic area. A geographic area may be divided into a plurality of geographic zones, each zone associated with one or more of the choke points described above. For example, a particular zone within a city may be associated with a plurality of highway exits or bridges. Again, as will be described in more detail below, this data may be used by server 110 or the client device to generate turn by turn directions.

It will be understood that one or more of map data 141, direction data 142, choke point data 143, and zone data 144 may be stored locally at the client device or stored at server 110 and transmitted to the client device over network 195 as needed.

In addition to the operations described below and illustrated in the figures, various operations in accordance with a variety of aspects of the invention will now be described. It should also be understood that the following operations do not have to be performed in the precise order described below. Rather, various steps can be handled in a different order or simultaneously.

A user may request turn by turn directions at a client device. The request may include, for example, an origination location and a destination area. The origination location may be the current location of the client device or a location inputted by the user. The destination area may identify a geographic area as opposed to a particular location, such as a street address, building name, or latitude and longitude coordinates. In that regard, the destination area may describe a highway, bridge, roadway exit, neighborhood, city, county, state, etc. For example, a user inputting a destination area into a client device, such as client device 171, may enter (or select from a list) "San Francisco," whereas a user inputting a particular location may enter "the intersection of Van Ness Street and Market Street in San Francisco."

Figure 3:
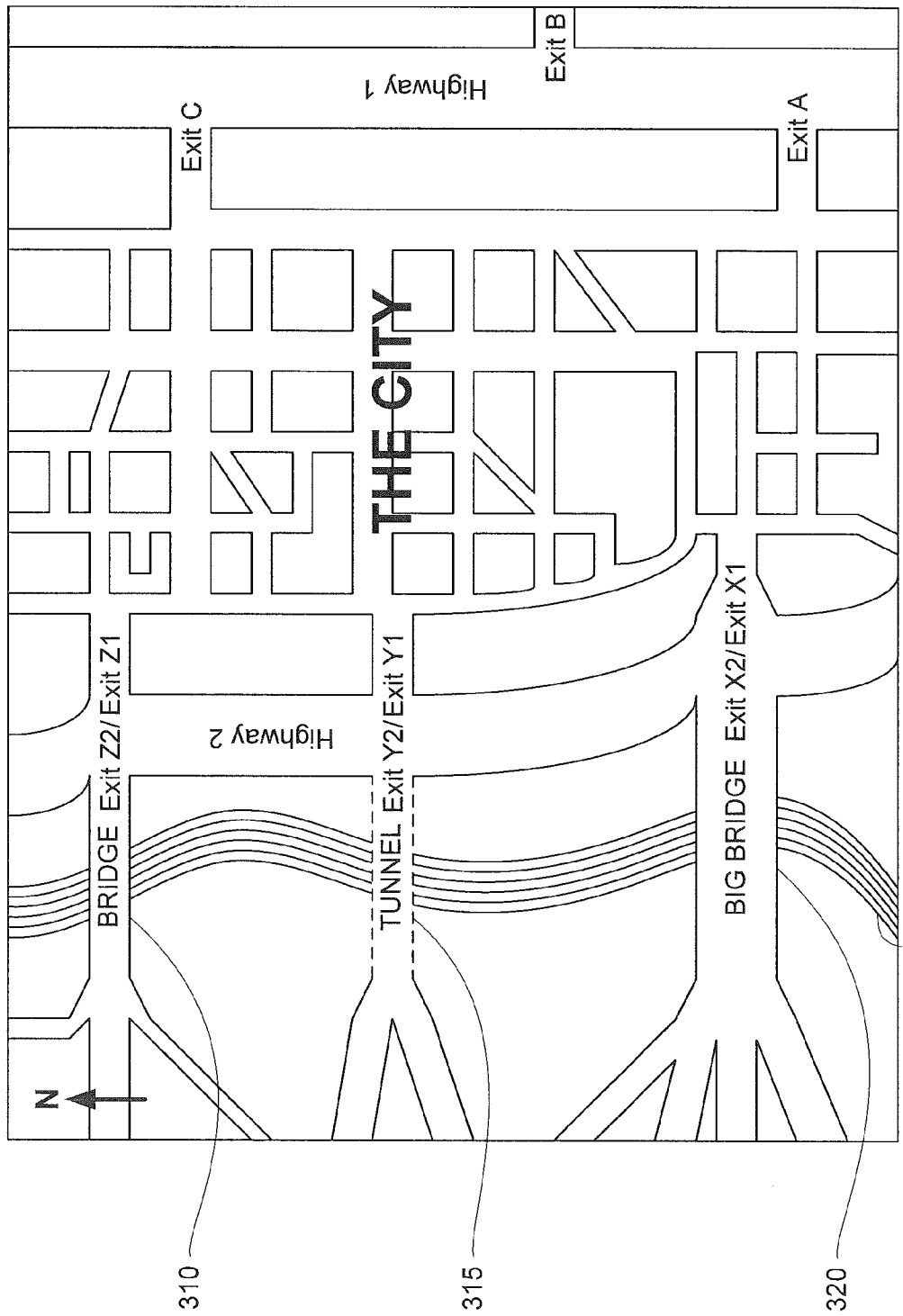
FIG. 3 is an exemplary map in accordance with one aspect of the invention.

Once the user has entered the destination area, inputted information may, for example, be transmitted to the server and used to identify a geographic area. For example, a user may enter a request for directions to "The City" (a fictitious city used for exemplary purposes only), into client device 171. This information may be transmitted to server 110, and used by the server to identify the geographic area associated with "The City" as shown in FIG. 3.

The identified geographic area may be associated with numerous access locations. For example, west of "The City" are two bridges 310 and 320 as well as a tunnel 315 which may be used to enter or exit from "The City" across waterway 330. East of waterway 330 and west of "The City" is Highway 2 which includes six exits, Exits X1-2, Y1-2, and Z1-2, which may be used to enter or exit the city. In addition, to the east of "The City" is Highway 1 which includes three exits, of which Exits A and C, may also be used to enter or exit the city.

Figure 4:
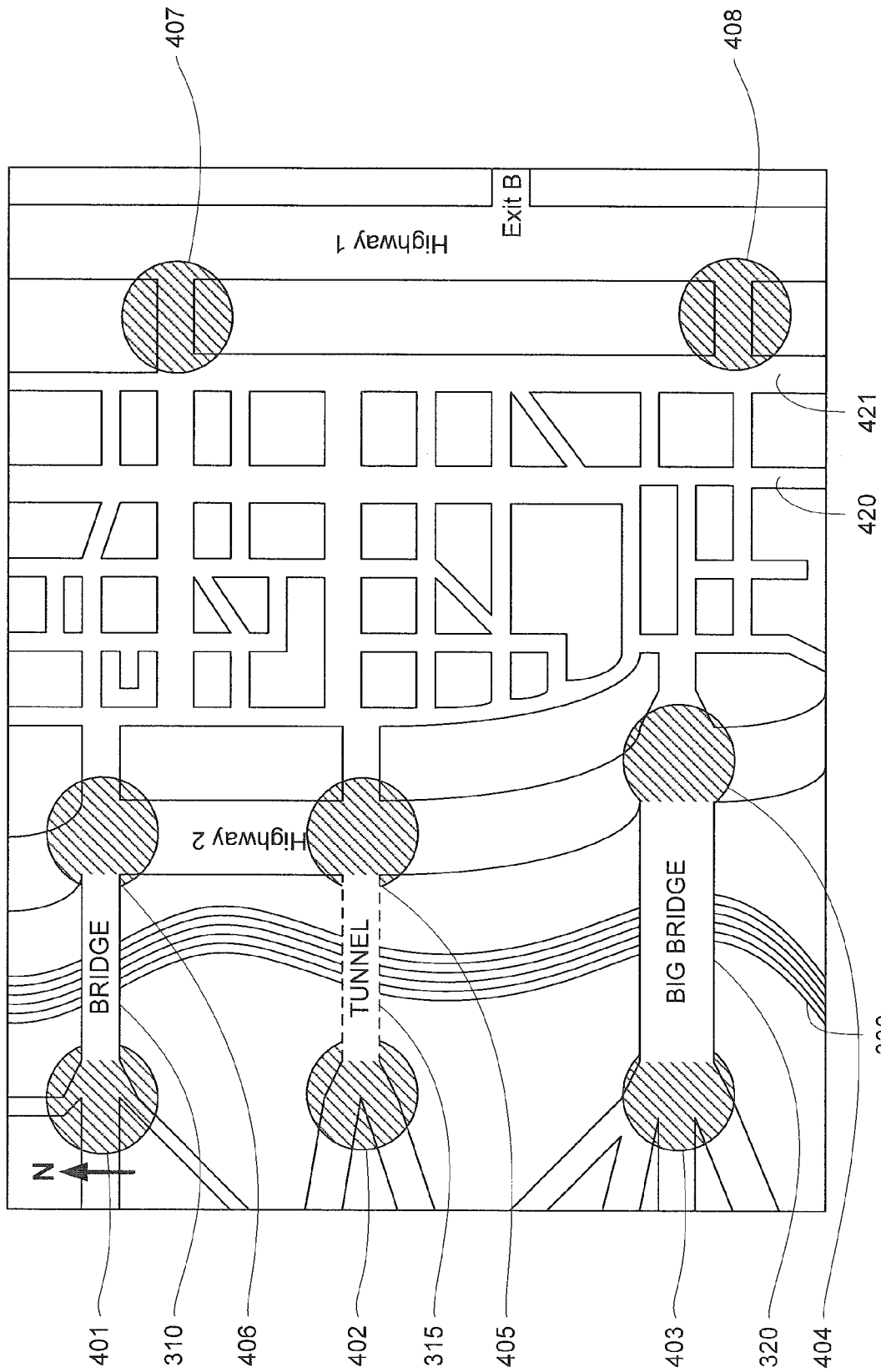
FIG. 4 is an exemplary map and data in accordance with one aspect of the invention.

Based on the access locations, the system may identify "choke points" associated with the geographic area. For example, as shown in FIG. 4, "The City" is associated with a plurality of choke points 401-08. These choke points generally describe access, entry and/or exit, points associated with "The City." For example, bridge 310 includes two choke points 401 and 406 on either side of waterway 330, while Highways 1 and 2 include choke points 404-408 associated with the highway exits which lead into or out of "The City" (see FIG. 2). Exit B of Highway 1 is not associated with a choke point for "The City" as it is not a convenient access location, entrance or exit to "The City." However, it will be understood that Exit B may be a choke point for a geographic area east of Highway 1 and proximate to Exit B.

Once a list of relevant choke points has been identified, a second list of choke points may be determined based on the origination location. The second list of choke points may be determined by removing or deleting choke points from the first list or alternatively by generating an entirely new list based on the first list. In one example, the origination location may be determined based on the current location of client device 171. Alternatively, the origination location may be entered into client device 171 by the user. The server may, for example, identify the second list of choke points based on the estimated time or distance to the choke point and from the origination location. In some examples, the server may consider current traffic conditions such as traffic or construction when determining an estimated travel time.

Figure 5:
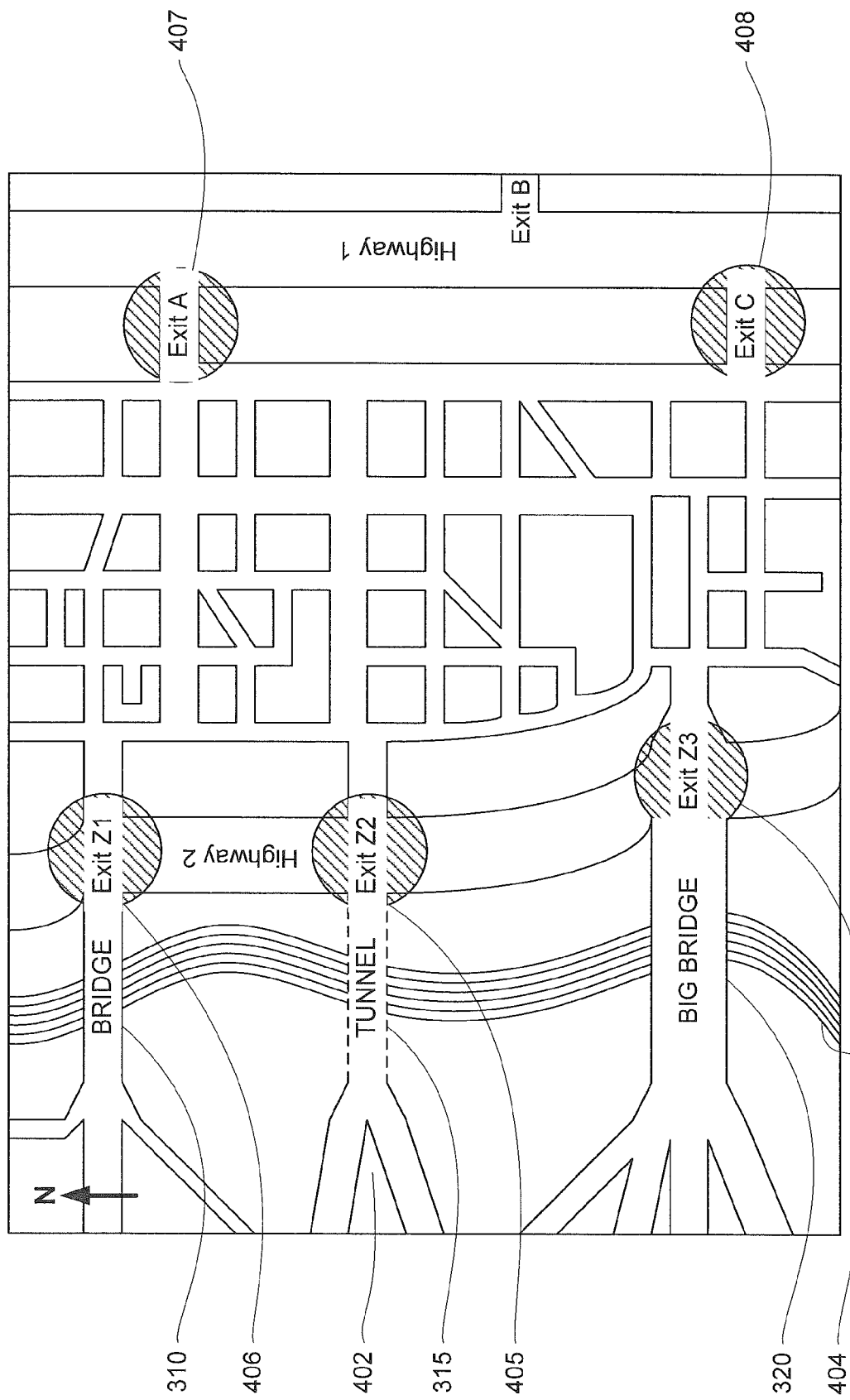
FIG. 5 is an exemplary map and data in accordance with one aspect of the invention.

If the origination location of the client device is east of waterway 330, the second list of choke points may include the choke points which would provide access to "The City" to a user traveling east of waterway 330. For example, as shown in FIG. 5, the second list of choke points may include choke points 404-408. This is because the user would not need to travel over waterway 330 in order to reach "The City." In addition, if the origination location is southeast of "The City," the second list may not include those choke points located along Highway 2 as traveling through these choke points would be less efficient than using the choke points of Highway 1.

Figure 6:
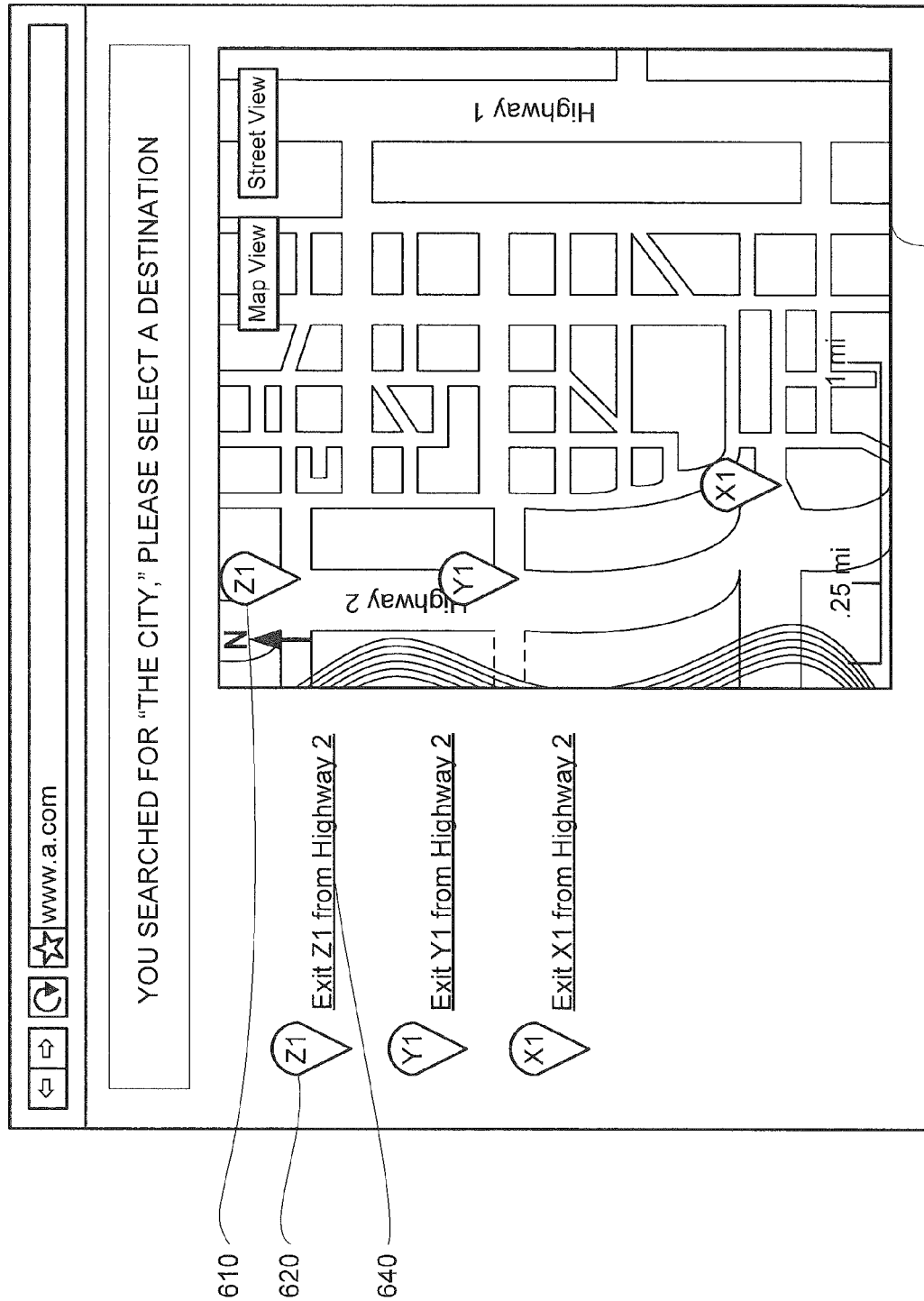
FIG. 6 is an exemplary screen shot in accordance with one aspect of the invention.

The client device may display a request for the user to select a choke point based on the second list of choke points. For example, as shown in FIG. 6, client device 171 may display a map of "The City" identifying two or more of the choke points of the second list and request that the user select an entryway into the city. The user may select a choke point based on the displayed information. For example, the user may select Exit Z1 from Highway 2 by clicking with a mouse on pointer 610 on map 630, on pointer 620, or on text 640.

Figure 7:
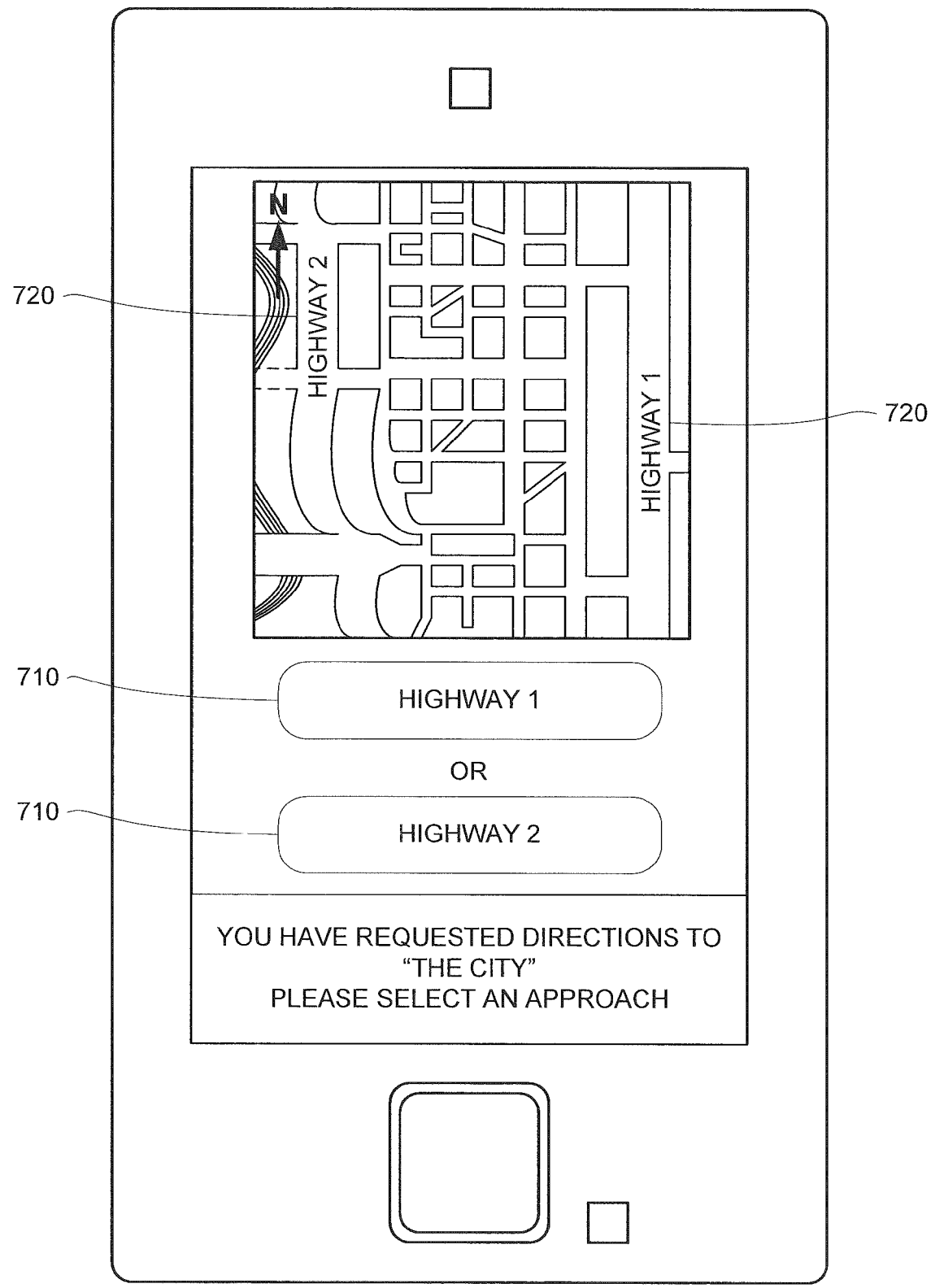
FIG. 7 is an exemplary client device and screen shot in accordance with one aspect of the invention.

Alternatively, the client device may list a plurality of entryways for the user to select based on the choke points. Client device 171 may identify the entryways in a plurality of different ways. For example, if the choke points of the second list of choke points include exits from one or more highways, the client device may display the name of the exit from a highway, the number of an exit from a highway, or even more generally by identifying a choice between two highways as shown in FIG. 7. In the example of FIG. 7, the user may select a highway by pressing buttons 710 or by pressing, if the device is a touch screen, on the location of the highways 720.

Once the user has made a selection, a set of turn by turn directions may be determined based on the selection and the origination location. The turn by turn directions may be used by the user to travel from the origination location to the destination location. This may be helpful to the user where the user is familiar with the destination area, but does not know an exact address or intersection. It may also be helpful if a user is in an unfamiliar location, and wants to leave or get to a more familiar location. For example if a user is in an unfamiliar city and wants to leave, it may be helpful to provide directions to a highway, bridge, or other exit from the city. In other words, referring to FIG. 3, if the user is within "The City" and wants to leave, the user may be provided with a number of choices including, for example, (1) Highway 1, (2) Highway 2, (3) Big Bridge 310, (4) Tunnel 315, or (5) Big Bridge 320.

Figure 8:
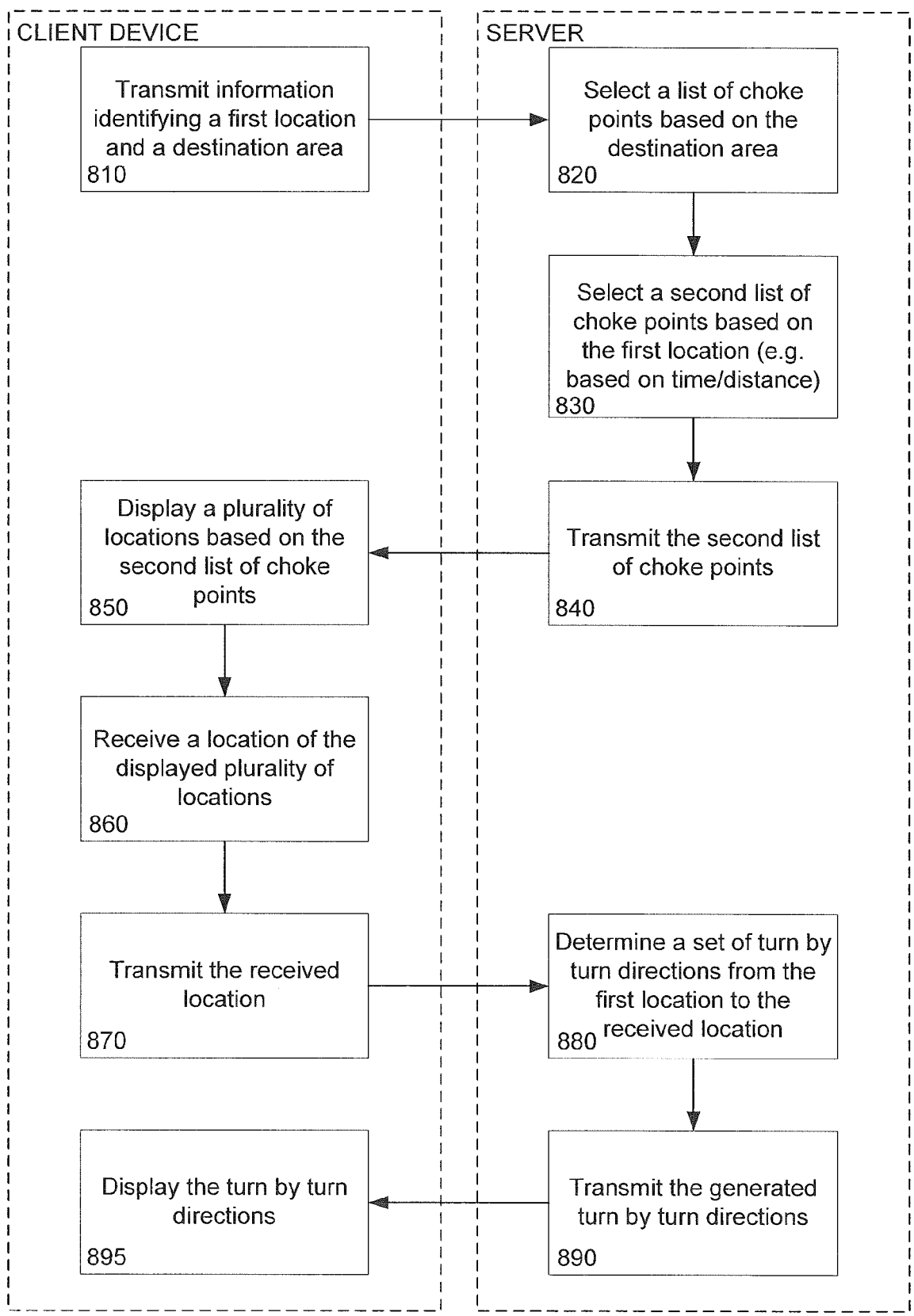
FIG. 8 is a flow diagram in accordance with aspects of the invention.

FIG. 8 depicts an exemplary embodiment for providing a user turn by turn directions based on a destination area where the process is divided between a server and client device sending and receiving information over a network. At block 810, the client device transmits a request for turn by turn directions including a first location (the origination location) and a destination area. The server selects a list of choke points based on the destination area at block 820. The server selects a second list of choke points based on the first list and the first location and transmits the second list to the client device as shown in block 830 and 840, respectively. The client device displays a plurality of locations based on the received second list as shown in block 850. Once the user selects a location, the client device transmits the selection to the server as shown in blocks 860 and 870. The server uses the first location and the selected location to determine a set of turn by turn directions at block 880. The turn by turn directions are transmitted by the server to the client device for display as shown in blocks 890 and 895, respectively.

Figure 9:
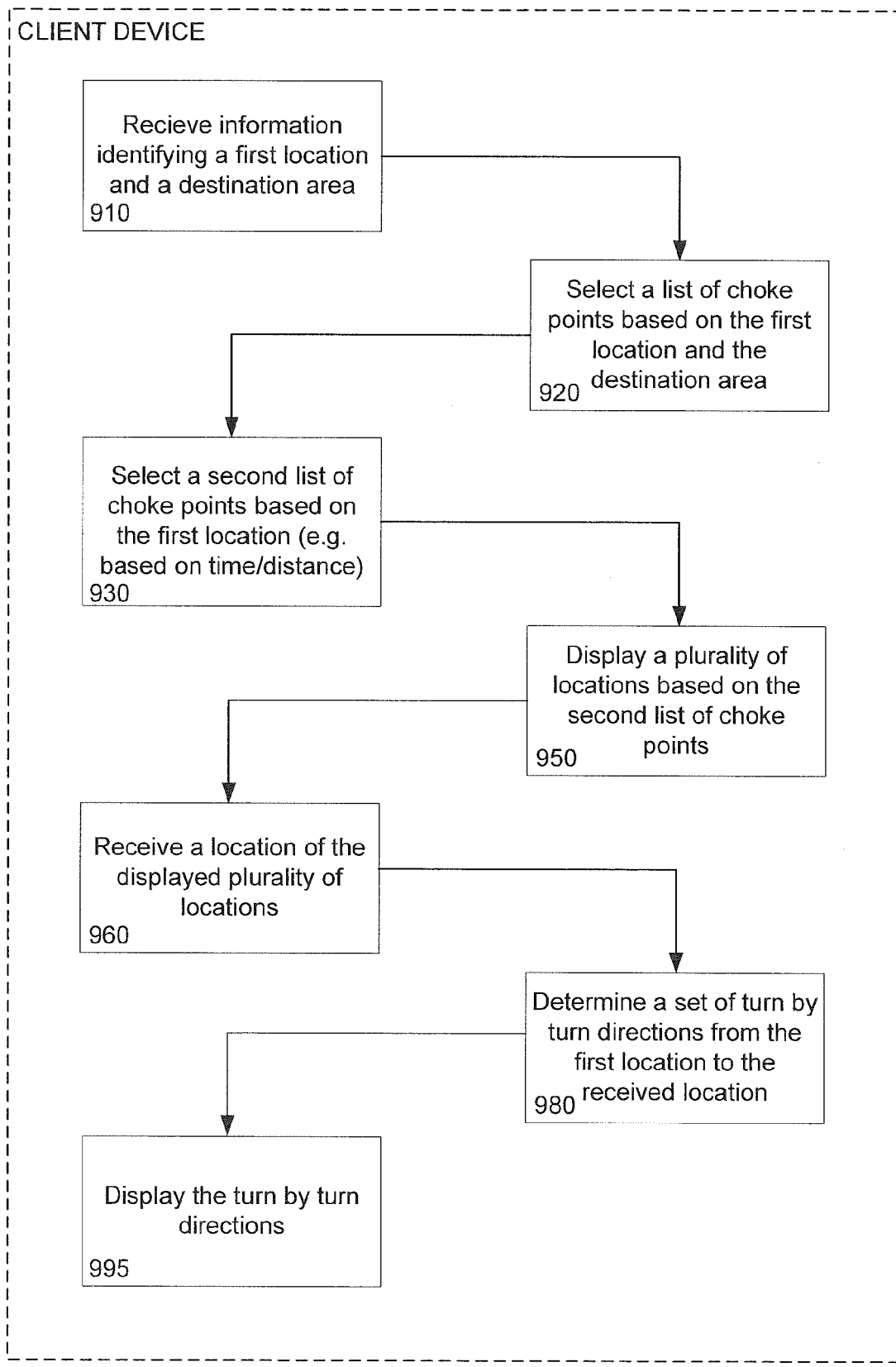
FIG. 9 is a flow diagram in accordance with aspects of the invention.

FIG. 9 depicts an alternative embodiment, where the steps are performed by the client device. The client device may still communicate with a server in order to receive updated map or chokepoint information. At block 910, the client device receives a request for turn by turn directions including a first location (the origination location) and a destination area. The client device selects a list of choke points based on the destination area at block 920. Next, the client device selects a second list of choke points based on the first list and the first location at block 930. The client device displays a plurality of locations based on the received second list as shown in block 950. Once the user selects a location, the client device uses the first location and the selected location to determine a set of turn by turn directions at block 980. The client device displays the turn by turn directions as shown in block 995.

Figure 10:
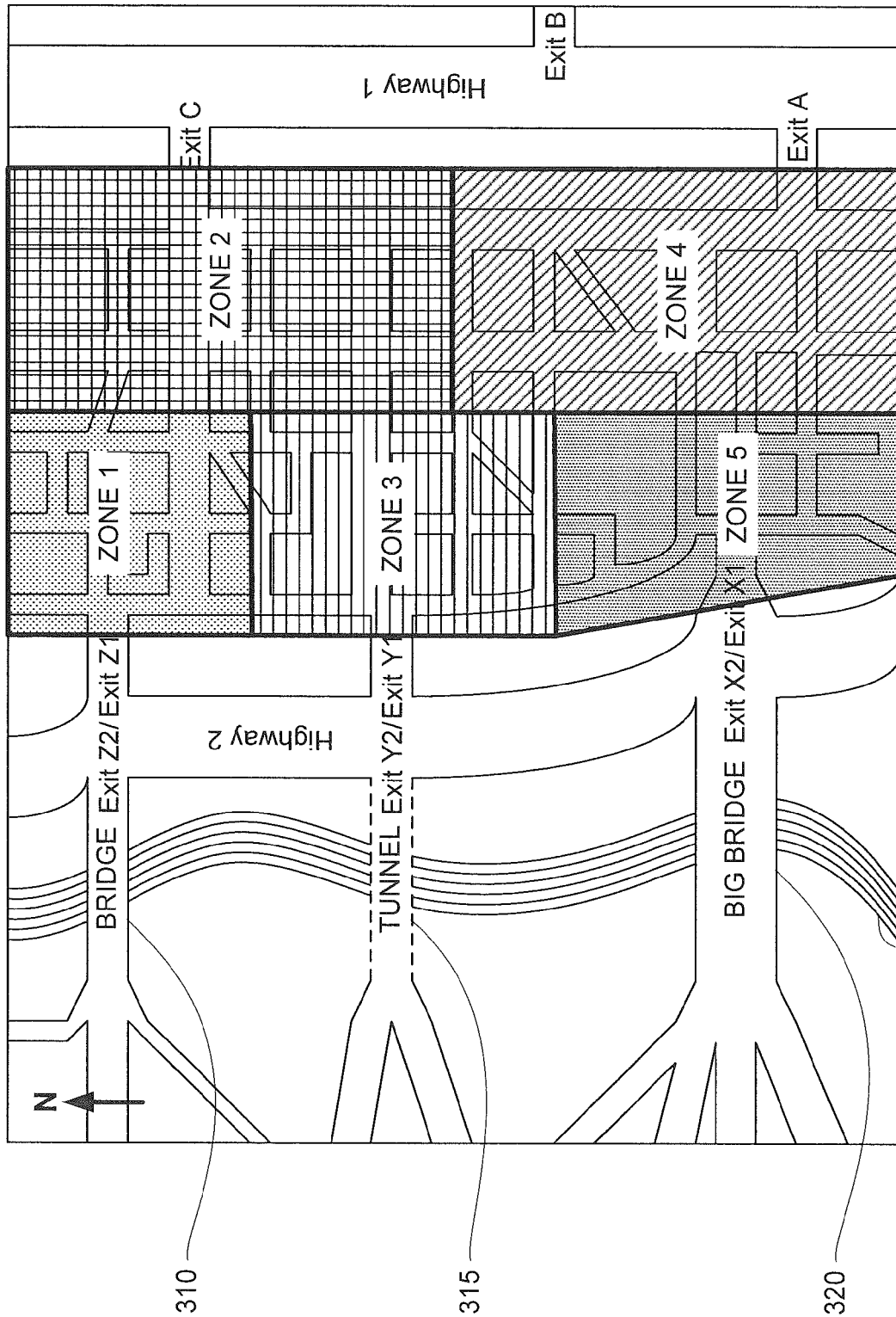
FIG. 10 is an exemplary map and data in accordance with one aspect of the invention.

In an alternative embodiment, in addition to being associated with one or more choke points, the destination area may also be associated with a plurality of zones. Each zone may define a subarea of the destination area. For example, as shown in FIG. 10, "The City" may be associated with five zones. Zones 1-5 each cover a subarea of "The City." Although the zones of FIG. 10 are depicted as geometric shapes which line the boundaries of the city, it will be understood that the zones may comprise any number of shapes and may even be defined based on access to one or more choke points.

Figure 11:
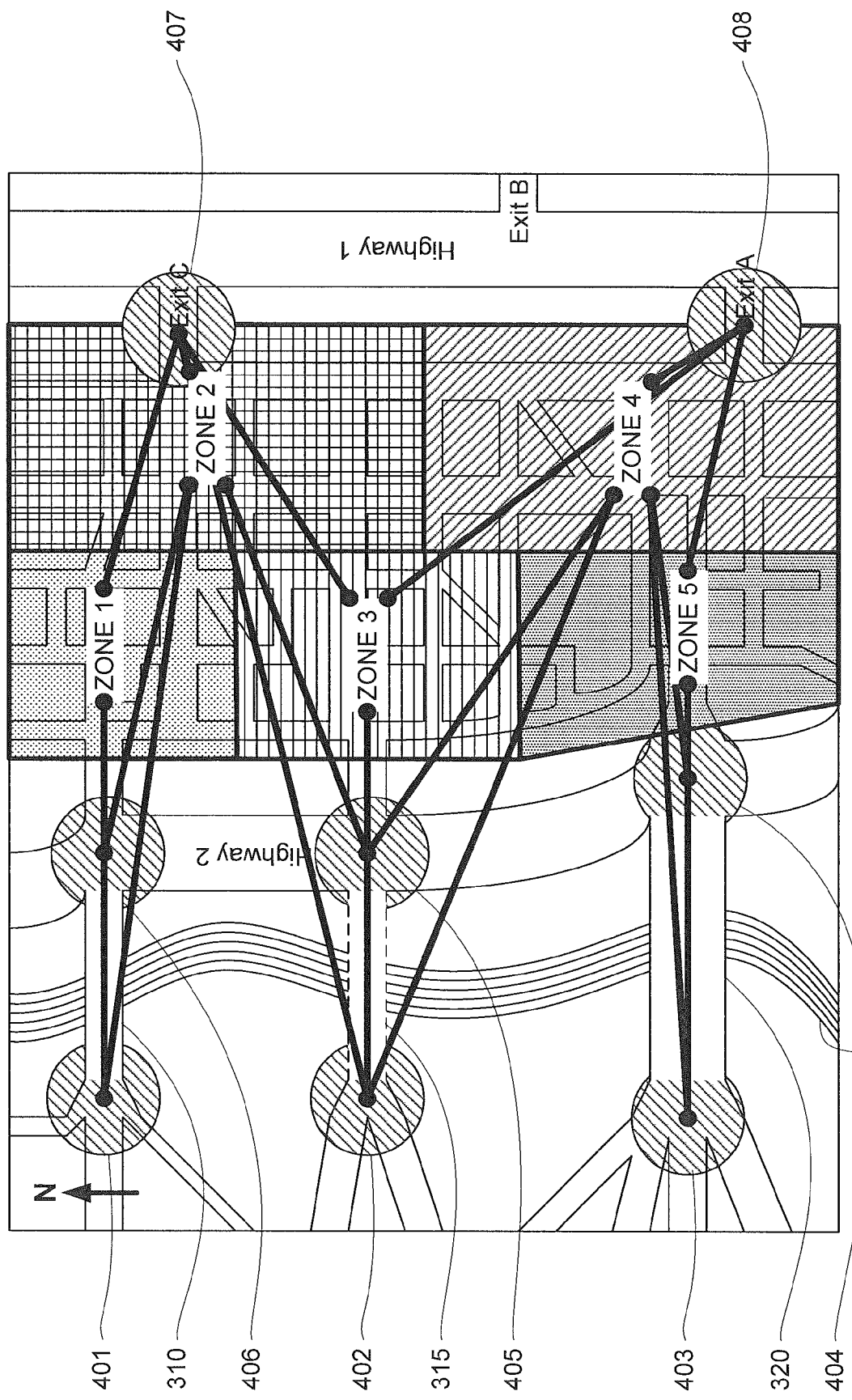
FIG. 11 is an exemplary map and data in accordance with one aspect of the invention.

The zones may be determined based on their proximity to choke points. For example, if the choke points of FIG. 4 are combined with the zones of FIG. 10, the resulting relationships may be depicted as shown in FIG. 11. The thick black lines between zones 1-5 and choke points 401-07 identify the exemplary relationships between the zones and choke points.

Figure 12:
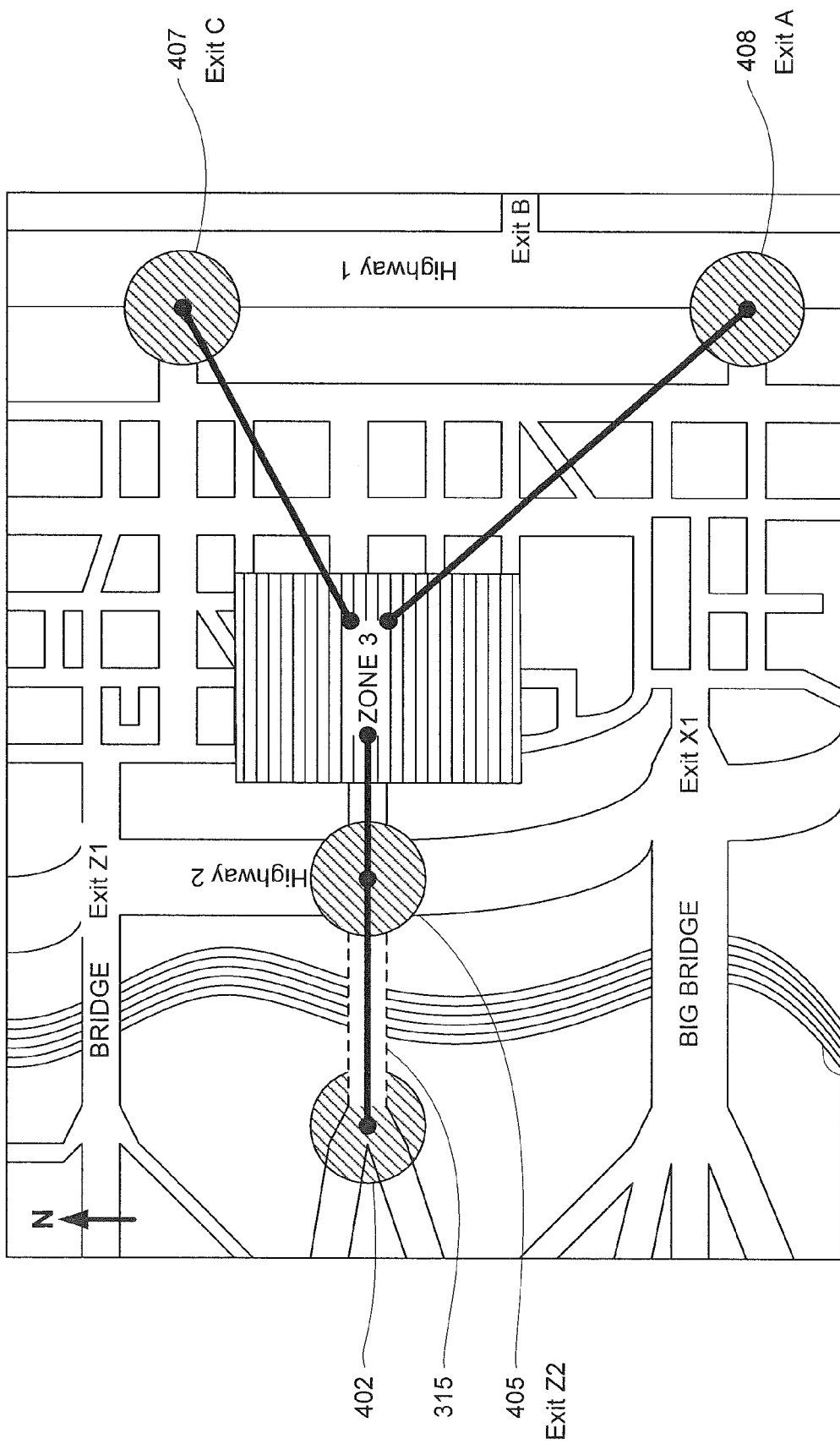
FIG. 12 is an exemplary map and data in accordance with one aspect of the invention.

For clarity and ease of understanding, FIG. 12 depicts a single zone, namely zone 3, and its associated choke points. As can be seen from the figure, zone 3 is associated with 4 choke points, including choke points 402, 405, 407, and 408. These choke points may be described as the most efficient access locations, for example, those with the shortest distances from zone 3.

Figure 13:
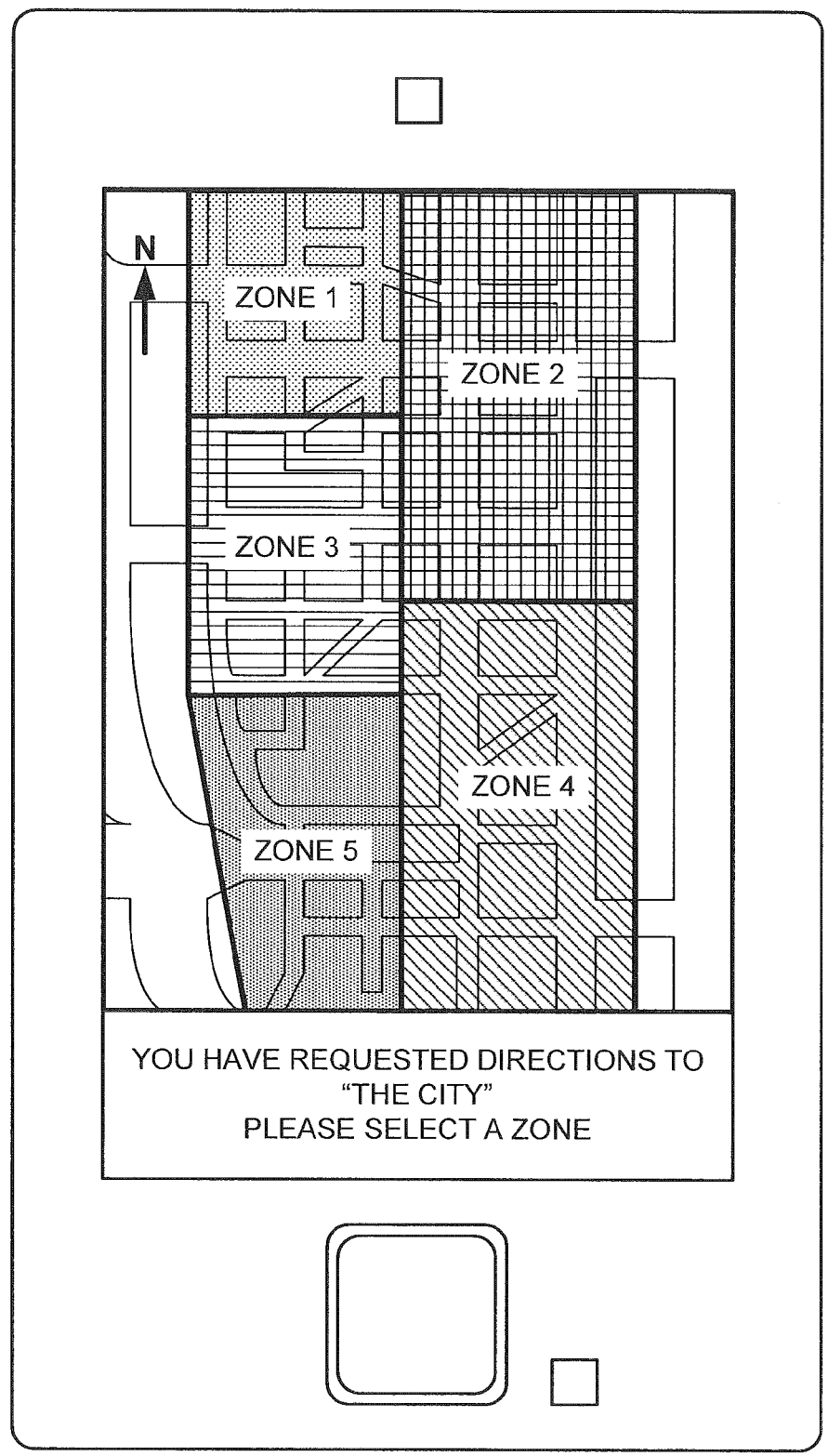
FIG. 13 is an exemplary client device and screen shot in accordance with one aspect of the invention.

When a user requests turn by turn directions from an origination location to a destination area, the zones may be used to select a choke point and generate turn by turn directions. For example, a plurality of zone may be identified based on the destination area. As shown in FIG. 13, the client device may display the zones and request that the user select a zone. Based on the selected zone and the destination, a choke point may be identified and used to generate a plurality of turn by turn directions from the origination location to the identified choke point.

Returning to FIG. 12, if the origination location is west of waterway 330 (and "The City") and the user selects zone 3, choke point 402 located at the entrance of tunnel 315 may be identified. Thus, the system may provide turn by turn directions from the origination location to the entrance of tunnel 315. In another example, if the origination location is southeast of "The City," choke point 408, associated with Exit A of Highway 1, may be identified and used to generate turn by turn directions from the origination location to Exit A of Highway 1.

Figure 14:
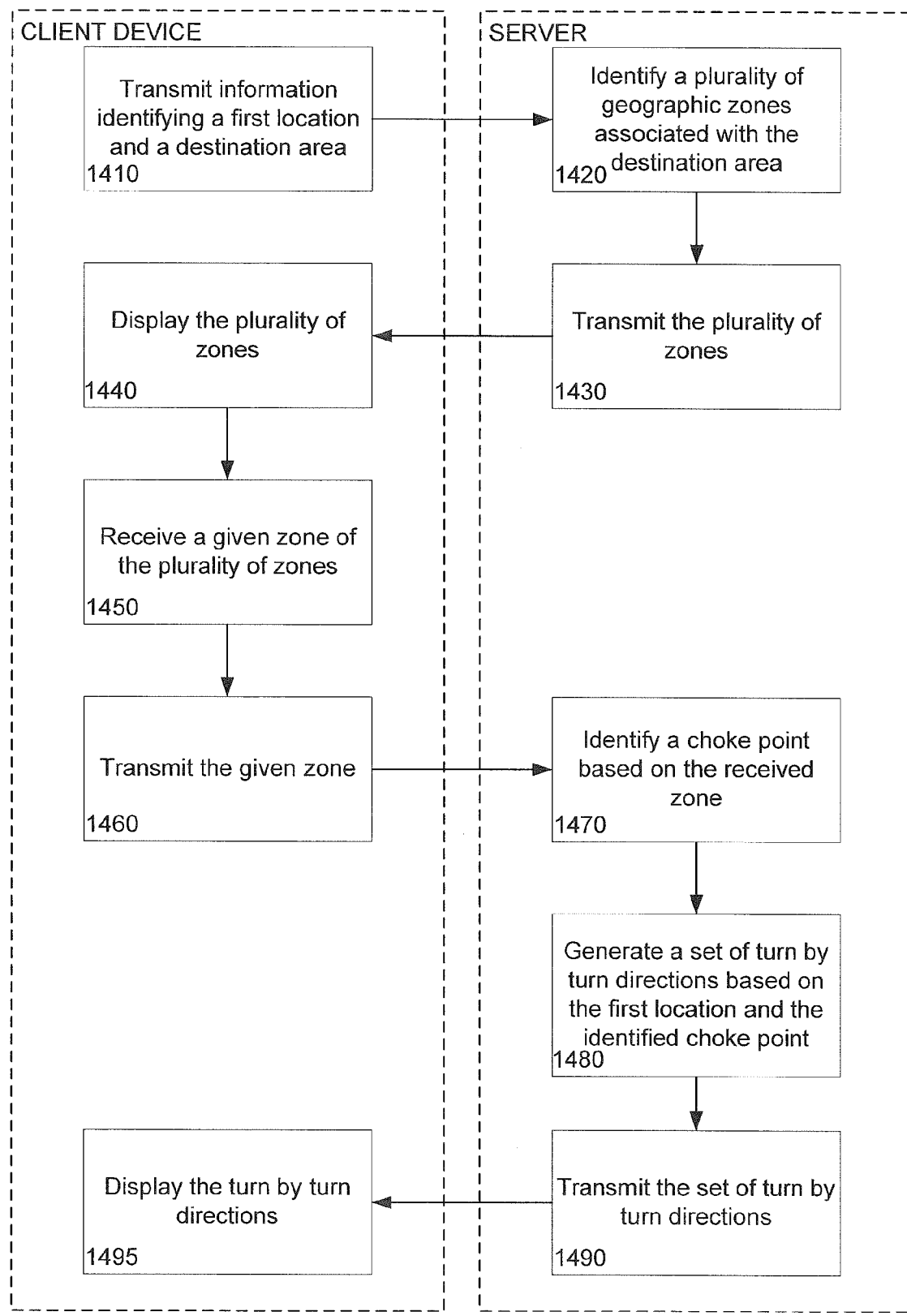
FIG. 14 is a flow diagram in accordance with aspects of the invention.

FIG. 14 depicts an exemplary embodiment for providing a user turn by turn directions based on a destination area utilizing choke points as well as zones. At block 1410, the client device transmits a request for turn by turn directions including a first location (the origination location) and a destination area. The server identifies a plurality of geographic zones associated with the destination area as shown in block 1420. The plurality of zones are transmitted by the server and displayed on the client device as shown in blocks 1430 and 1440, respectively. The client device receives a zone, selected by the user, and transmits the identity of the zone to the server as shown in blocks 1450 and 1460, respectively. Based on the received zones and the first location, at block 1470 the server identifies a choke point. Next, at block 1480 the server generates a set of turn by turn directions based on the first location and the identified choke point. The turn by turn directions are transmitted by the server to the client device for display as shown in blocks 1490 and 1495, respectively.

Figure 15:
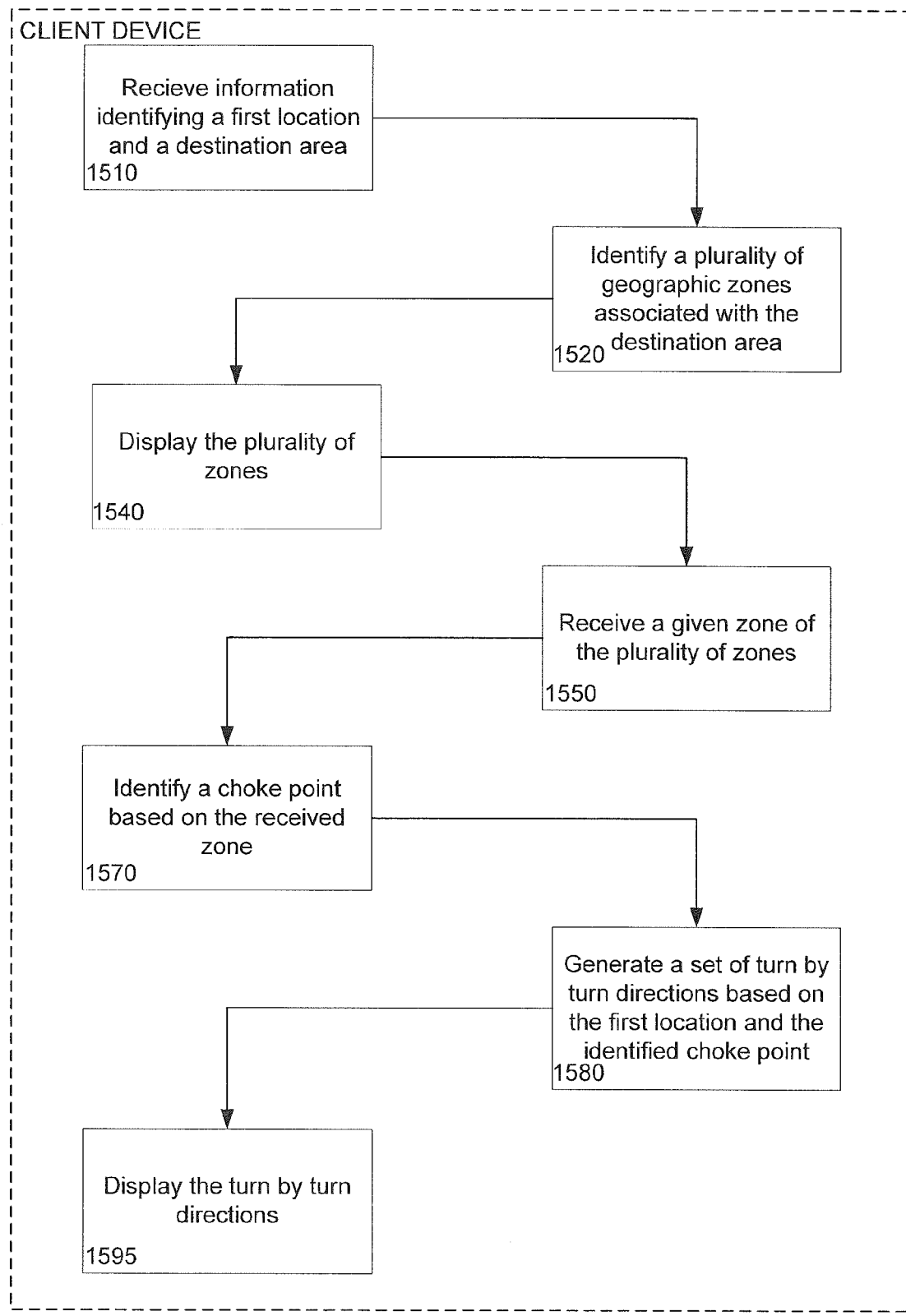
FIG. 15 is a flow diagram in accordance with aspects of the invention.

In an alternative embodiment, the client device may perform the majority of the steps of FIG. 14, as shown in FIG. 15. For example, the client device receives a first location (origination location) and a destination location and uses this information to identify a plurality of zones as shown in blocks 1510 and 1520, respectively. The client device displays the zones and receives a selected zone of the plurality of zones as shown in blocks 1540 and 1550, respectively. The client device identifies a choke point based on the received zone and the first location as shown in block 1570. Next, at block 1580, the client device generates a set of turn by turn directions based on the first location and the identified choke point, and displays the turn by turn directions as shown in block 1595.

The choke points or zones may be filtered to remove less relevant destinations. For example, choke points associated with less well known or efficient roadways, such as local roads 420 and 421 of FIG. 4. However, if traffic along Highway 1 is heavy, these choke points may be included in the user's choices. In another example, if a user were traveling to "The City" and presently located on BIG BRIDGE 320, it would not be useful to display Exit C of Highway 1, thus, this choke point may be filtered for omission.

In a further example, choke points may be filtered based on a local calculation. Referring to FIG. 10, if (A) the client device is located 20 minutes west of "Exit Y1/Y2", (b) the client device is located an hour and a half from "Exit A", and (c) "Exit Y1/Y2" is 20 minutes to the farthest location in Zone 4 (proximate to "Exit A"), there would be no reason to identify "Exit" A as a choke point. Thus, this choke point may be "filtered" from the choices displayed on the client device. In another example, if a third highway, highway 3, may run south of the "The City" east and west between highways 1 and 2 along the zone 4 and 5 boundaries, the most relevant choke point choices for a user traveling to "The City" would be "Exit X1" or "Exit A" of Highways 2 and 1 respectively. If it would take the client device exactly as long to travel to either choke point, and the client device is somewhere exactly along the zone 4 and 5 boundaries, either choke point would be an efficient choice. For each amount of time or distance that the client device moves closer to "Exit X1" along Highway 3, the time to travel to "Exit A" by way of Highway 3 increases, but the time to travel to "Exit A" by way of "Exit X1" decreases. Thus, without knowing the user's exact destination, both of the exits may be displayed as choices for the user.

Various aspects of the system and method may be pre-computed or computed on demand. For example, referring to the (A)-(B)-(C) example above, the times computed in (A) and (B) may be determined based on the current location of the client device (e.g. on demand) whereas (C) may be pre-computed and stored at the client device or server.

In another example, the choke points and/or zones may be pre-computed by the server or client device. In an alternative, the choke points and/or zones may be computed on demand. For example, a client device located somewhere west of "The City" may request turn-by-turn directions to "The City." In response, the server, or client device, may computer a route and/or turn-by-turn directions from the client device's current location to every location in "The City." It will be understood various locations may be down-sampled to reduce the number of iterations, for example, for a particular location, such as Manhattan, 1000 distributed locations may be used to identify the relevant choke points. The route or set of turn-by-turn directions may be compared to determine that each set crosses specific locations, such as choke points 404, 405, and 406. These choke points may then be used to partition "The City" into zones. Thus, similar to FIGS. 6 and 10, the choke point and/or zone choices may be displayed to the user as possible destinations.

The examples described above may be used with various types of input. For example, in addition to, or in lieu of a keyboard, touch screen, or other physical input devices, the client device may include a microphone a voice recognition software. A user may thus enter a destination area by speaking instructions. For example, a user within "The City" may state: "I want to leave 'The City'" or "get me out of 'The City'" and in response, receive a list of suggested choke points as described above. Similarly, the user may select the choke point by speaking the name of the choke point.

In other aspects, functions described above as being performed by the server may be performed by the client device, and vice versa. For example, the client may determine the locations for the turn by turn directions, transmit these to the server, and receive the turn by turn directions from the server. In yet more aspects, the client device and server perform and share different functions.

Unless stated otherwise, the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "including" and the like) should not be interpreted as limiting the invention to the specific examples; rather, the examples are intended to illustrate only one of many possible embodiments.

The invention claimed is:

1. A computer-implemented method for providing turn by turn directions, the method comprising:
   receiving an indication of a destination area;
   identifying a plurality of choke points associated with the destination area, wherein each of the plurality of choke points is in proximity to the destination area, and wherein each of the plurality of choke points provides access to the destination area;
   selecting, based on the destination area, one or more of the plurality of choke points;
   providing for display, the one or more of the selected choke points;
   receiving an indication of a user-selection of one of the one or more of the selected choke points; and
   providing a set of turn by turn directions to the user-selected choke point associated with the destination area.

2. The computer-implemented method of claim 1, wherein further
   the indication of the destination area is received from a client computing device, and
   wherein the turn by turn directions are provided for the client computing device.

3. The computer-implemented method of claim 1, further comprising:
   receiving an indication of a start location, wherein the selecting the one or more of the plurality of choke points is based on a distance between the start location and each of the plurality of choke points.

4. The computer-implemented method of claim 3, wherein the start location is a current location of the client computing device, and wherein the turn by turn directions to the user-selected choke point are provided based on the current location of the client computing device.

5. The computer-implemented method of claim 1, further comprising:
   receiving an indication of a start location, wherein the indication of the start location and the indication of the destination area are received from a client computing device, and wherein the start location and the destination area are stored in a memory.

6. The computer-implemented method of claim 1, further comprising:
   receiving an indication of a start location, wherein the start location is an address, and wherein the destination area is the name of a city.

7. The computer-implemented method of claim 1, wherein the one or more of the plurality of selected choke points are provided for display on a map, wherein the map is configured to receive a user-selection of one of the one or more of the selected choke points.

8. A computer-implemented method for providing turn by turn directions, the method comprising:
   receiving, an indication of a destination area;
   identifying a start location;
   identifying a plurality of destination zones associated with the destination area, wherein each of the plurality of destination zones comprises a physical portion of the destination area;
   storing the plurality of destination zones in a memory;
   providing for display, the stored plurality of destination zones;
   receiving an indication of a user-selection of one of the plurality of destination zones;
   identifying, based on the start location and the indication of the user-selected destination zone, a choke point, which is in proximity to the user-selected destination zone, and provides access to the user-selected destination zone; and
   providing for display, based on the start location and the indication of the user-selected destination zone, a set of turn by turn directions to the identified choke point.

9. The computer-implemented method of claim 8, wherein the indication of the destination area is received from a client computing device and
   wherein the turn by turn directions are provided for the client computing device.

10. The computer-implemented method of claim 8, wherein the identifying the choke point is based on a distance between the start location and the user-selected destination zone.

11. The computer-implemented method of claim 9, wherein the start location is a current location of the client computing device.

12. The computer-implemented method of claim 9, wherein the start location and the destination area are stored in a memory upon input into the client computing device.

13. The computer-implemented method of claim 9, wherein the plurality of choke points are stored in a memory.

14. The computer-implemented method of claim 8, wherein the plurality of destination zones are provided for display on a map, wherein the map is configured to receive a user-selection of one of the plurality of destination zones.

15. A computer-implemented method for providing turn by turn directions, the method comprising:
   sending to a server, an indication of a destination area, wherein the server is configured to determine, based on the destination area and the start location, a plurality of choke points, wherein each of the plurality of choke points is in proximity to the destination area, and wherein each of the plurality of choke points provides access to the destination area;
   displaying, the plurality of choke points received from the server;
   sending an indication of a user-selection of one of the displayed plurality of choke points; and
   displaying a set of turn by turn directions, received from the server, to the user-selected choke point.

16. The computer-implemented method of claim 15, wherein the indication of the destination area is sent to the server via a network interface of a client computing device, and wherein the turn by turn directions are received from the server via the network interface of the client computing device.

17. The computer-implemented method of claim 15, further comprising identifying a start location, wherein the server is further configured to select the plurality of choke points based on an estimated travel time between the start location and each of the plurality of choke points.

18. A computer-implemented method for providing turn by turn directions, the method comprising:

sending to a server, an indication of a start location and a destination area, wherein the server is configured to determine, based on the start location and the destination area, a plurality of destination zones, wherein each of the plurality of destination zones comprises a physical portion of the destination area;

displaying the plurality of destination zones received from the server;

sending to the server, an indication of a user-selection of one of the displayed plurality of destination zones, wherein the server is further configured to identify, based on the start location and the user-selected destination zone, a choke point which is in proximity to the user-selected destination zone, and provides access to the user-selected destination zone; and displaying a set of turn by turn directions to the choke point, wherein the turn by turn directions are received from the server.

19. The computer-implemented method of claim 18, wherein the choke point is selected based on an estimated travel time between the start location and the choke point.

20. The computer-implemented method of claim 18, wherein the destination area is a name of a city, and wherein the start location is an address.

* * * * *

UNITED STATES PATENT AND TRADEMARK OFFICE
CERTIFICATE OF CORRECTION

PATENT NO. : 8,428,866 B1
APPLICATION NO. : 12/834307
DATED : April 23, 2013
INVENTOR(S) : Barry Hayes It is certified that error appears in the above-identified patent and that said Letters Patent is hereby corrected as shown below:

IN THE CLAIMS:

In Column 11, Line 43

Remove "further".

Signed and Sealed this
Thirteenth Day of August, 2013

Teresa Stanek Rea
*Acting Director of the United States Patent and Trademark Office*